US012517721B2

(12) United States Patent
Thakare et al.

(10) Patent No.: US 12,517,721 B2
(45) Date of Patent: Jan. 6, 2026

(54) MECHANISMS TO IMPLEMENT CONTROLLED UPGRADES

(71) Applicant: Salesforce, Inc., San Francisco, CA (US)

(72) Inventors: Shrikant Thakare, Burlington, MA (US); Zhuo Yao Chen, Needham, MA (US); Hemanth Siddulugari, Dublin, CA (US); Julian Chow, San Francisco, CA (US); Anila Kumar Garimella, Milpitas, CA (US); Shivakarthik Subramanyam, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 240 days.

(21) Appl. No.: 18/341,530

(22) Filed: Jun. 26, 2023

(65) Prior Publication Data

US 2024/0427589 A1   Dec. 26, 2024

(51) Int. Cl.
| | |
|---|---|
| *G06F 8/60* | (2018.01) |
| *G06F 8/65* | (2018.01) |
| *G06F 8/656* | (2018.01) |
| *G06F 9/4401* | (2018.01) |
| *G06F 9/50* | (2006.01) |
| *G06F 16/27* | (2019.01) |

(52) U.S. Cl.
CPC ............. *G06F 8/656* (2018.02); *G06F 8/65* (2013.01); *G06F 9/442* (2013.01); *G06F 9/5077* (2013.01); *G06F 16/27* (2019.01)

(58) Field of Classification Search
CPC ........ G06F 16/27; G06F 9/5077; G06F 9/442; G06F 8/656
See application file for complete search history.

(56) References Cited

U.S. PATENT DOCUMENTS

| | | | |
|---|---|---|---|
| 8,719,227 B1 | 5/2014 | Rousseau et al. | |
| 9,400,829 B2 | 7/2016 | Shadmon | |
| 9,658,899 B2 | 5/2017 | Jenkins | |
| 2022/0114157 A1* | 4/2022 | Rangasamy | .......... G06F 9/5077 |
| 2024/0095021 A1* | 3/2024 | Agrawal | ................. G06F 16/27 |
| 2024/0202008 A1* | 6/2024 | Palacherla | .............. G06F 9/442 |

* cited by examiner

*Primary Examiner* — Tuan A Vu

(74) *Attorney, Agent, or Firm* — Kowert, Hood, Munyon, Rankin & Goetzel, P.C.; Mark D. Seegers; Dean M. Munyon

(57) ABSTRACT

Techniques are disclosed pertaining to performing upgrades by upgrade controllers. A node upgrade controller determines to upgrade a first set of nodes, of a plurality of nodes, on which executes a first set of pods that facilitate access to an instance of a particular component. The node upgrade controller obtains a lock on the plurality of nodes to prevent a pod upgrade controller from upgrading a second set of pods that execute on a second set of the plurality of nodes and facilitate access to another instance of the particular component. The unavailability of the first and second sets of pods causes a requisite number of instances of the particular component to be unavailable. The node upgrade controller upgrades the first set of nodes and releases the lock to allow the pod upgrade controller to obtain a lock on the plurality of nodes.

20 Claims, 9 Drawing Sheets

MECHANISMS TO IMPLEMENT CONTROLLED UPGRADES

BACKGROUND

Technical Field

This disclosure relates generally to computer systems and, more specifically, to various mechanisms for performing upgrades by upgrade controllers in a controlled manner.

Description of the Related Art

Cloud infrastructure typically includes hardware and software computing resources via which applications can execute that communicate with end users. For example, an application may execute in a virtual environment hosted on server-based hardware included in a datacenter of a cloud provider. Updates to the cloud infrastructure or the software deployed by tenants to that cloud infrastructure are often developed over time. As an example, a new virtual machine (VM) image that can be used to instantiate a VM onto the cloud infrastructure might be created by a VM developer. In many cases, multiple software resources (e.g., VMs) utilize the same version of software (e.g., the same server image) and thus an update to the software can involve updating more than one software resource. Moreover, the software resources may be expected to continue to interact with end users and other entities even when an upgrade to those software resources is planned.

DETAILED DESCRIPTION

Figure 1:
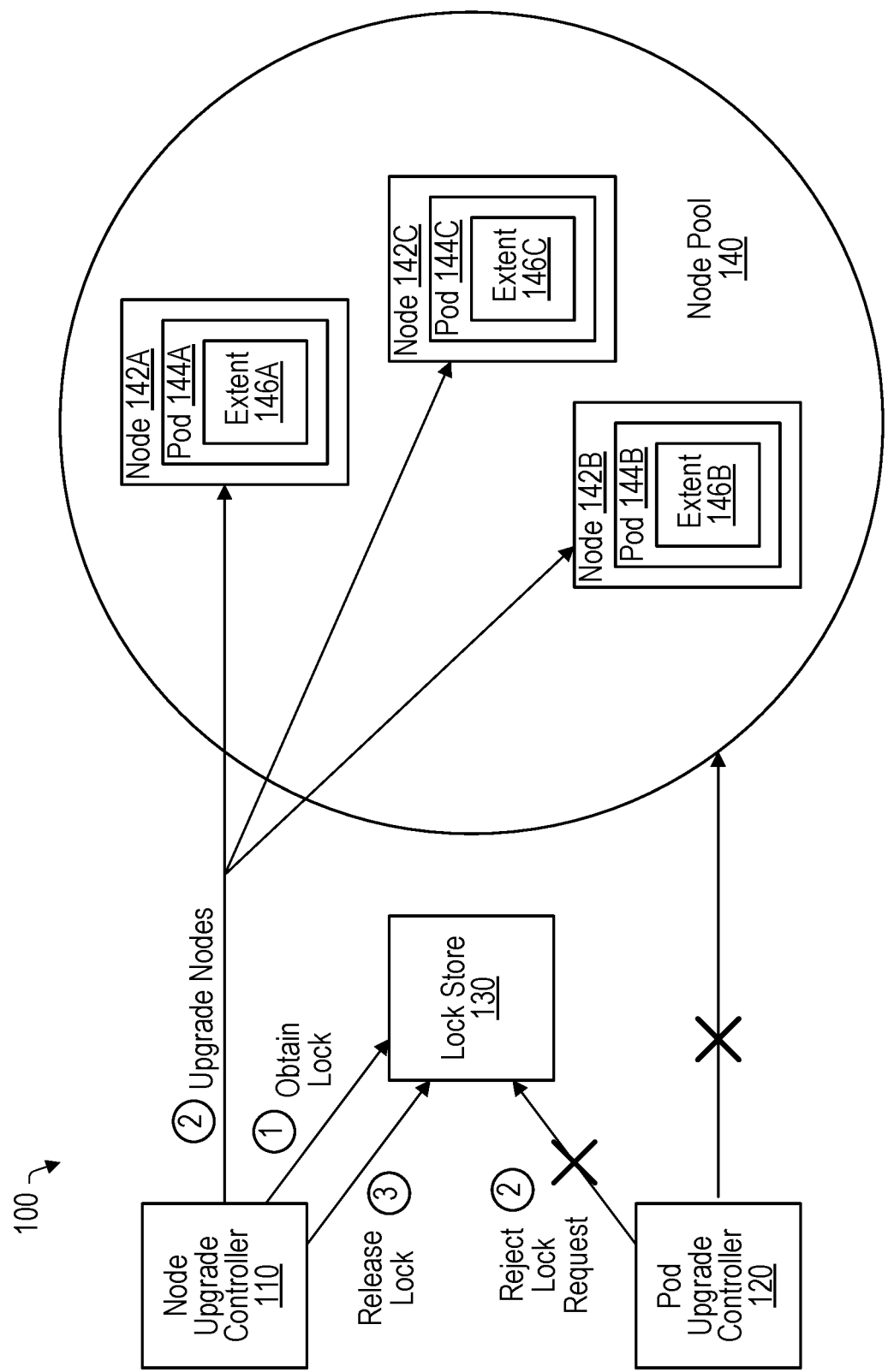
FIG. 1 is a block diagram illustrating example elements of a system having a node pool and a node upgrade controller and a pod upgrade controller that perform upgrades with respect to the node pool, according to some embodiments.

In many cases, companies are now shifting from deploying their applications on a local infrastructure to deploying them on a cloud infrastructure that is provided by a cloud provider, such as Amazon™. Nodes (e.g., VMs), storage volumes, and other cloud resources are usually provisioned to the cloud infrastructure to enable the deployment and execution of applications. In various cases, multiple nodes are provisioned to the cloud infrastructure, and an application or service is distributed across the nodes via pods that are deployed to those nodes. A pod is a deployable unit that comprises a group of one or more containers (e.g., an application container for implementing an application and/or a sidecar container for collecting telemetry) that share various resources (e.g., storage and network resources). For example, a storage service may be distributed across multiple nodes by deploying, to those nodes, "storage" pods having a storage application that implements at least a portion of the storage service. Storage services typically replicate data to multiple locations such that there are multiple instances of the data in order to prevent data loss or unavailability of the data. For example, a data record of a database may be replicated across multiple storage pods that execute on respective nodes residing in different locations of the cloud infrastructure.

When an update is released for a node or a pod (e.g., an update to an application of the pod), it is often desirable to upgrade the node or the pod since the updated version can include fixes to vulnerabilities and/or software bugs. In various embodiments, pods are upgraded by a component referred to as a pod upgrade controller when a new pod version is available, and likewise, nodes are upgraded by a separate component referred to as a node upgrade controller when a new node version is available. When a node or pod undergoes an upgrade, the data that is managed by the pod being upgraded, or the pod of the node that is being upgraded, becomes unavailable to various database operations. As mentioned, a storage service may replicate data across multiple locations so that there are multiple instances of the data. Availability issues can arise with respect to the data if the upgrade controllers do not perform their respective upgrades in a controlled manner. Consider an example in which a data record is replicated across three different nodes and is managed by storage pods on those nodes. An availability issue can occur during a period when the pod upgrade controller is upgrading a storage pod that provides access to a first instance of the data record while the node upgrade controller is concurrently upgrading a node that hosts a storage pod that provides access to a second instance of the data record. If, during that upgrade period, the storage pod that provides access to the third and final instance of the data record goes down (e.g., its system loses power), then all three instances/copies of the data record become inaccessible, causing a service disruption as a user cannot access their data record. This disclosure addresses, among other things, the problem of how to coordinate the upgrades that are performed by decoupled upgraded controllers so as to prevent undesirable scenarios, such as the discussed availability issue.

In various embodiments described below, a computer system includes multiple upgrade controllers (e.g., a pod upgrade controller and a node upgrade controller), a pool of nodes (or, "node pool") on which pods execute, and a lock store. A particular component of the computer system, such as a file that stores data records, is replicated across multiple nodes such that there are multiple instances of that particular component, whose access is facilitated by pods residing on the nodes. In various embodiments, the computer system implements a locking mechanism to prevent the multiple, decoupled upgrade controllers from concurrently performing upgrades that can affect access to the particular component such that a requisite number of instances of the particular component is not available. When an upgrade controller intends to implement an upgrade for the node pool (e.g., a node by the node upgrade controller), the upgrade controller obtains a lock on the node pool that prevents the other upgrade controller(s) from performing upgrades for the node pool. The lock may be a versioned object that is created and stored by the upgrade controller at the lock store via a lock API. The lock API can include operations to create a new lock, release the lock when the upgrade operation is complete, and renew the lock if the upgrade controller needs additional time to complete the upgrade operation. When the lock is created for the upgrade controller, it is stored in the lock store and may expire after a period of time. During that period of time, in various embodiments, the upgrade controller has exclusive access to perform upgrades for the node pool. When the upgrade controller has completed its task, the upgrade controller releases the lock, and the node pool is made available to the other upgrade controllers. While the node pool is locked, the other upgrade controller(s) may determine if there are other node pools that are not locked and then perform upgrades for those node pools before reattempting to obtain a lock on the initial node pool.

These techniques may be advantageous as these techniques prevent multiple upgrade controllers from disrupting access to a particular component of a service. In particular, the pod upgrade controller and node upgrade controller are able to coordinate their respective upgrades, thus minimizing the access impact to data. Further, these techniques allow for that coordination even in the case of controllers that perform upgrades at different levels of the system (e.g., the node upgrade controller at the node level and the pod upgrade controller at the pod level). That is, these techniques allow for coordinating controllers that are not fighting over upgrading the same type of component. Moreover, since the locking mechanism utilizes an API, the locking mechanism is flexible and may be utilized by any type of upgrade controller without extensive configuration of that upgrade controller—that is, the same API component can be incorporated into different upgrade controllers. Also, the locking mechanism can be considered to be non-blocking. In particular, if an upgrade controller wishes to perform an upgrade but a lock already exists on the particular node pool, then the upgrade controller can decide to either wait or defer the node pool for a later time and start an upgrade on another node pool.

Turning now to FIG. 1, a block diagram of a system 100 is shown. System 100 includes a set of components that may be implemented via hardware or a combination of hardware and software. In the illustrated embodiment, system 100 includes a node upgrade controller 110, a pod upgrade controller 120, a lock store 130, and a node pool 140. As further depicted, node pool 140 includes nodes 142A-C having pods 144A-C, respectively, and pods 144A-C include extent 146A-C, respectively. In some embodiments, system 100 is implemented differently than shown. For example, node upgrade controller 110 and pod upgrade controller 120 might execute within node pool 140 (e.g., execute on a node 142 of node pool 140).

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Thus, node upgrade controller 110, pod upgrade controller 120, lock store 130, and node pool 140 may execute on and utilize the available cloud resources of the cloud infrastructure (e.g., computing resources, storage resources, network resources, etc.) to facilitate their operations. As an example, node upgrade controller 110 may execute in a virtual environment hosted on server-based hardware included within a datacenter. But in some embodiments, system 100 is implemented utilizing a local or private infrastructure as opposed to a public cloud.

Node pool 140, in various embodiments, is a collection of nodes 142 that are dedicated to running one or more services (e.g., a database service, a storage service, etc.). While a single node pool 140 is depicted, in various embodiments, system 100 implements multiple services that each run within a respective node pool 140 and thus there can be multiple node pools 140 in system 100 that are operated on by node and pod upgrade controllers 110 and 120. A node 142, in various embodiments, is a VM that has been deployed, e.g., onto resources of a cloud infrastructure of node pool 140. The resources may include hardware (e.g., CPUs, GPUs, disks, etc.), software routines (e.g., operating systems), or a combination thereof that are provisioned by a cloud provider to the cloud infrastructure. In some embodiments, a node 142 is a physical computing device (e.g., server hardware) on which applications can be deployed or otherwise installed. Thus, node pool 140 may correspond to at least a portion of the cloud infrastructure provided by a cloud provider and be made available to one or more tenants (e.g., government agencies, companies, individual users, etc.). For cases in which there are multiple tenants using node pool 140, node pool 140 can provide isolation so that the data of one tenant is not exposed (without authorization) to other tenants. In some embodiments, node pool 140 corresponds to the particular resources being used by a tenant.

In various embodiments, a node 142 is deployed by node upgrade controller 110 using a node image. A node image is a template having a software configuration (which can include an operating system) that can be used to deploy an instance of a VM. Amazon Machine Image (AMI) is one example of a node image. AMI can include snapshots (or a template for the root volume of the instance (e.g., an operating system)), launch permissions, and/or a block device mapping that specifies the volume(s) (e.g., a storage) to attach to that instance when it has been launched. In various embodiments, the software executing on one node 142 may interact with the software that is executing on another node 142. For example, a process executing on node 142A might communicate with a process executing on another node 142B to transfer data from the storage of node 142A to the storage of that other node 142B. Once a node 142 is deployed, pods 144 having applications which may access and store data can be deployed onto that node 142 (e.g., by pod upgrade controller 120 using Kubernetes™).

A pod 144, in various embodiments, is a deployable unit comprising a set of application containers, with shared resources (e.g., storage and network resources), and a specification for executing those application containers. For example, a pod 144 may include a container having a storage application that manages data stored in extents 146, including storing data in extents 146 and accessing that data upon request. In various embodiments, pods 144 are deployed by a large-scale deployment service, such as Kubernetes. Once a node 142 has been deployed and become an available resource to Kubernetes, it may deploy a requested pod 144 onto that node 142. Deploying a pod 144 onto a given node 142 may involve Kubernetes communicating with an agent residing on that node 142, where the agent triggers the execution of the containerized applications in the pod 144—Kubernetes may use a control plane that can automatically handle the scheduling of pods across the nodes 142 in node pool 140. In various embodiments, a node 142 can support multiple pods 144, and thus Kubernetes may deploy multiple pods 144 onto a node 142. While pods 144 are discussed, in some embodiments, applications can be installed on a node 142 and executed without the use of containerization.

An extent 146, in various embodiments, is a region of memory or a data structure (e.g., a file) that is allocated for storing records. In some embodiments, there are two main types of extents 146: a data extent 146 and a log extent 146. A data extent 146 may comprise the actual data of a database (not shown) and may be append-only such that new records are appended to that data extent 146 until a size threshold is reached. Each of those records may comprise data and a database key that can be used to look up that data record. For example, a data record 112 may correspond to a row in a database table where the record specifies values for attributes of the database table. A log extent 146 may comprise log records describing database operations (e.g., record insertions) performed as a result of executing database transactions. Similarly to a data extent 146, a log extent 146 may be append-only and may continuously receive appends as transactions do work. Pods 144A-C, in various embodiments, include a storage application that interacts with a database application, which can be included in another set of pods 144. As part of that interaction, the database application may issue requests to the storage application to store results of work performed by the database application (e.g., records resulting from a transaction) and to access previously stored records. Accordingly, the storage application can create extents 146 to store incoming records from the database application and subsequently access records from those extents 146.

In various embodiments, multiple instances/copies of an extent 146 may be distributed across multiple nodes 142 in node pool 140. In particular, the different instances of the storage application that have been deployed in pods 144 to different nodes 142 may communicate with each other to ensure that an extent 146 is replicated to at least a threshold number of different nodes 142. For example, extents 146A-C can correspond to the same extent (i.e., they store the same records) that has been replicated to nodes 142A-C, respectively. When a node 142 or a pod 144 undergoes an upgrade, the extent(s) 146 of the pod 144 being upgraded or the pod 144 of the node 142 that is being upgraded become unavailable. An availability issue of the data of extents 146A-C arises if, concurrently, pod upgrade controller 120 upgrades pod 144A, node upgrade controller 110 upgrades node 142B, and node 142C (or pod 144C) goes down during the upgrades as all three copies of the extent become inaccessible. This issue can cause a disruption to the operation of a database application that seeks to access data from that extent and thus it may be desirable for node and pod upgrade controllers 110 and 120 to perform their upgrades in a controlled manner.

Node upgrade controller 110, in various embodiments, is software that is executable to manage tasks pertaining to upgrading nodes 142, including upgrading nodes 142 to a new node image. Node upgrade controller 110 may be a stateless process that runs separately (e.g., on its own set of nodes) and independently of nodes 142. In various embodiments, the trigger event for node upgrade controller 110 to start its node upgrade process is image version drift between the image of currently-deployed nodes 142 and a new image version that has been stored in a repository accessible to node upgrade controller 110. That is, node upgrade controller 110 may detect the presence of a new node image and then proceed to perform the upgrade process for a set of nodes 142. In some cases, node upgrade controller 110 may receive a request to upgrade nodes 142 to a new image. When upgrading a node 142, in various embodiments, node upgrade controller 110 obtains a lock on node pool 140 via a lock API that can be used to store metadata about the lock in lock store 130. Lock store 130, in various embodiments, is a distributed object in the cluster and stores all active locks held by upgrade controllers. Lock store 130 is discussed in greater detail with respect to FIG. 2. While the lock is active, in various embodiments, node upgrade controller 110 has exclusive access to upgrading components of node pool 140. Thus, once node upgrade controller 110 has obtained a lock on node pool 140, it may then upgrade one or more nodes 142. When the update process is completed, node upgrade controller 110 may release the lock via the lock API, allowing for pod upgrade controller 120 to obtain a new lock on node pool 140.

To upgrade a node 142, in various embodiments, node upgrade controller 110 deploys (e.g., using a deployment system, such as Kubernetes™) a new node 142 based on the updated node image. Node upgrade controller 110 may then cause a copy operation to be performed to copy particular data from a storage volume of the old node 142 to a storage volume of the new node 142. Node upgrade controller 110 may also route write traffic to other nodes 142 in order to ensure that users have access to certain resources (e.g. extents 146) as the upgrade is running. After completion of the copy operation, in various embodiments, node upgrade controller 110 evicts pods 144 from the old node 142 and redeploys them on the new node 142. Node upgrade controller 110 may then route write traffic to the new node 142, and the redeployed pods 144 may service that write traffic using the data copied to the new node 142.

Pod upgrade controller 120, in various embodiments, is software that is executable to manage tasks related to upgrading pods 144, including upgrading pods 144 to a new pod image. Pod upgrade controller 120 may also be a stateless process that runs separately (e.g., on its own set of nodes) and independently of nodes 142. In various embodiments, pod upgrade controller 120 can detect the presence of a new pod image and then perform its upgrade process for a set of pods 144 of node pool 140. In some cases, pod upgrade controller 120 may receive a request to upgrade pods 144 to a new pod image. When upgrading a pod 144, in various embodiments, pod upgrade controller 120 obtains a lock on node pool 140 via the lock API. In various cases, there may already be an existing lock on node pool 140 (e.g., node upgrade controller 110 has a lock on node pool 140). If an existing lock is active for node pool 140, pod upgrade controller 120 is prevented from obtaining a lock on node pool 140 and therefore unable to update pods 144. Pod upgrade controller 120 may either wait until the existing lock is released (or expires) or it may proceed to upgrade pods 144 of another node pool 140—node upgrade controller 110 performs the same process if it cannot obtain a lock. An example assessment process that may be performed by upgrade controllers is discussed in more detail with respect to FIGS. 4 and 5A-B. If pod upgrade controller 120 is able to obtain a lock on node pool 140, it may then upgrade one or more pods 144. To upgrade a pod 144, in various embodiments, pod upgrade controller 120 uses an on-delete strategy in which a pod 144 is deleted and a new pod 144 is created with the upgraded image (e.g., using a deployment system, such as Kubernetes™). When the update process is completed, pod upgrade controller 120 may release the lock, allowing node upgrade controller 110 to obtain a new lock on node pool 140.

While only two upgrade controllers are depicted in FIG. 1, in some embodiments, there can be more upgrade controllers. For example, there may be an upgrade controller that handles upgrades pertaining to resources (e.g., a firewall) provisioned to a node 142. Thus, more than two upgrade controllers may seek to perform upgrades for node pool 140 and thus the disclosed locking mechanism can allow for those upgrade controllers to perform their upgrades without causing certain types of disruptions, as discussed. Furthermore, while locking node pools 140 is discussed, in various embodiments, other types of resources (e.g., data records) can be locked by upgrade controllers (or other components) through the locking mechanism discussed in this disclosure.

Figure 2:
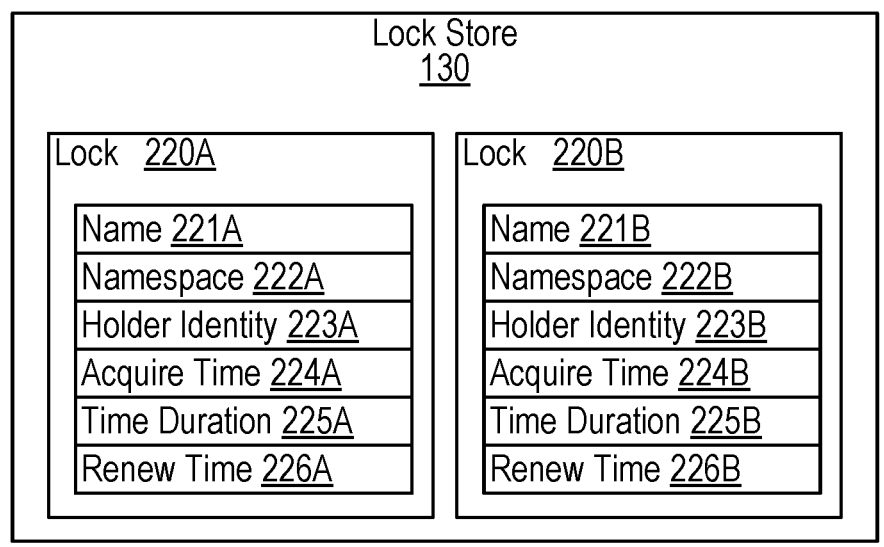
FIG. 2 is a block diagram illustrating example elements of a lock store that stores records of locks, according to some embodiments.

Turning now to FIG. 2, a block diagram of an example lock store 130 is shown. In the illustrated embodiment, lock store 130 includes locks 220A-B. As further shown, locks 220A-B are each respectively associated with a name 221, a namespace 222, a holder identity 223, an acquire time 224, a time duration 225, and a renew time 226. In some embodiments, lock store 130 is implemented differently than shown. For example, a lock 220 may be associated with additional metadata about the state of that lock 220 (e.g., active or expired).

Lock store 130, in various embodiments, is a store (e.g., a key-value store) that is used to store records describing locks 220 that are acquired on node pools 140. Lock store 130 may run separately (e.g., on its own set of nodes) and independently of nodes 142. Moreover, lock store 130 may be deployed as a distributed object on multiple systems and its records replicated across those systems so that they can be accessed from different locations. Due to its distributed nature, lock store 130 may implement a synchronization mechanism to ensure that records are properly synced between the locations where lock store 130 resides. In various embodiments, lock store 130 also implements mechanisms to manage race conditions in order to ensure that only at least one lock 220 is held on a particular node pool 140 at a time. Lock store 130 may further collect telemetry data regarding its operation so that optimizations may be made to lock store 130 or so that bugs may be corrected. The information stored in lock store 130, in various embodiments, is accessible to node upgrade controller 110, pod upgrade controller 120, and/or other approved upgrade controllers. In some embodiments, lock store 130 also stores records that describe locks 220 that are acquired on other types of resources than node pools 140.

A lock 220, in various embodiments, is a versioned object that is created by an upgrade controller via the lock API. When an upgrade controller seeks to obtain a lock 220 on a certain node pool 140 and determines that no lock 220 is held on that node pool 140, then the upgrade controller may invoke lock API to create a versioned object at lock store 130 that represents a lock on that node pool 140. The versioned object, in various embodiments, contains metadata describing the identity of the lock 220, the upgrade controller that obtained the lock 220, and the associated node pool 140 being upgraded. As depicted for example, lock 220A includes a name 221A. Name 221, in various embodiments, specifies the resource type (e.g., a pod) and resource name (e.g., the name assigned to the pod) for which the associated lock 220 has been obtained. Name 221 may be specified in the format resource_type-resource_name and provide the flexibility to use locks 220 for multiple resource types. In various embodiments, name 221 may be used as a key for looking up a corresponding lock 220. In addition to name 221A, lock 220A is associated with namespace 222B. A namespace, in various embodiments, is used to logically separate components into groups within a cluster. Example namespaces are discussed in further detail with respect to FIG. 3. When a lock 220 is being created, the upgrade controller may relay the identity of the namespace for the component being upgraded (or the namespace of the upgrade controller), and the namespace is stored as namespace 222 for the lock 220. For example, pod upgrade controller 120 may relay the name of the namespace for the set of pods 144 being upgraded. As shown, locks 220 are associated with holder identities 223 that refers to the names of the upgrade controllers that obtained the locks 220. For example, if pod upgrade controller 120 invokes the lock API to generate a lock 220, then the holder identity 223 of that lock 220 specifies the name of pod upgrade controller 120.

In various embodiments, when an upgrade controller invokes the lock API to create a lock 220, a time value is recorded when that lock 220 is created and stored as the acquire time 224 for that lock 220. The time value may, for example, specify the time of day on a particular date when the corresponding lock 220 was acquired, or the time of a local or global clock that is managed by system 100 or a subcomponent (e.g., lock store 130) of system 110. Locks 220 may also be associated with a time duration 225. Time duration 225, in various embodiments, indicates the remaining amount of time until an associated lock 220 self-expires and is released independent of whether the upgrade controller releases it. By self-expiring, this may prevent any node pool 140 from being locked indefinitely (e.g., in the case that the upgrade controller that acquired the lock 220 crashes). After an upgrade controller completes its updates, it may release an acquired lock 220 prior to the allotted amount of time being used. In various cases, the remaining amount of time of time duration 225 is not sufficient to complete upgrading the relevant components (e.g., pods 144) and thus an upgrade controller may decide to renew time duration 225, ensuring that the corresponding lock 220 expires at a different time (e.g., a later time), and logs the time of renewal as renew time 226. For example, the initial time duration 225 may be ten minutes, but during this time, node upgrade controller 110 may not complete the upgrade process on a particular node pool 140 and thus may renew that time duration 225 for an additional ten minutes. In some embodiments, instead of recording a time duration, locks 220 expire a certain amount of time after their renew time 226 (e.g., ten minutes)—the amount of time may be a user-specified criterion. In some cases, an upgrade controller may renew the time duration 225 of a particular lock 220 after each upgrade or a set of upgrades. For example, node upgrade controller 110 may renew its lock 220 on a particular node pool 140 in between upgrading each node 142 or after upgrading a threshold number of nodes 142 (e.g., after twenty nodes 142).

Figure 3:
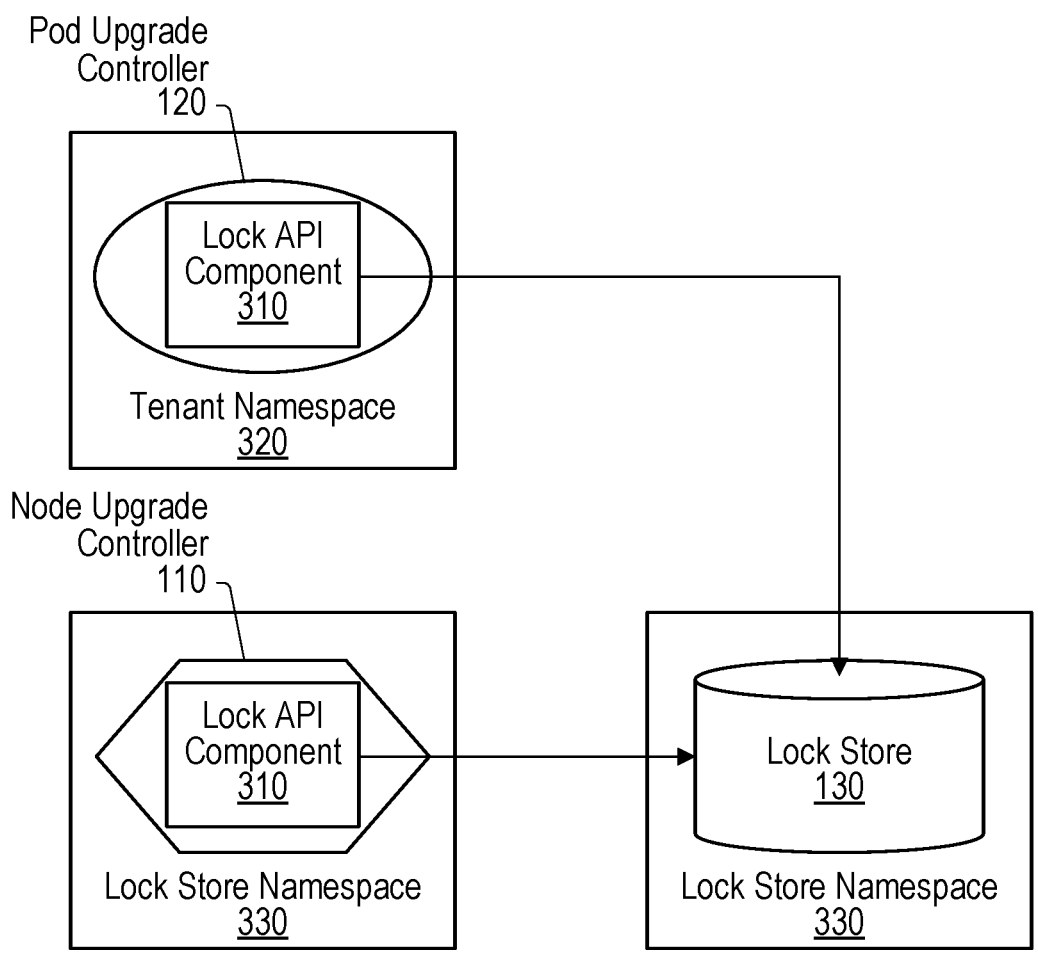
FIG. 3 is a block diagram illustrating a lock application programming interface (API) component that is incorporated in the node upgrade controller and the pod upgrade controller to enable them to interact with the lock store, according to some embodiments.

Turning now to FIG. 3, a block diagram of an example interaction between pod upgrade controller 120 and lock store 130 and between node upgrade controller 110 and lock store 130 is shown. In the illustrated embodiment, pod upgrade controller 120 includes a lock API component 310 and exists in a tenant namespace 320. Similarly, node upgrade controller 110 includes lock API component 310 and exists in a lock store namespace 330. The illustrated embodiment may be implemented differently than shown. For example, lock store 130 and node upgrade controller 110 may exist in different namespaces.

In various embodiments, lock store 130 is deployed in a protected system namespace (e.g., lock store namespace 330). A namespace is used to logically separate components into groups within a cluster, and the workload from one namespace may be isolated from another namespace. In various embodiments, a first namespace can be granted access to a second namespace so that the components of the first namespace can interact with the components of the second namespace. The upgrade controllers may be granted authorization via role-based authorization to interact with lock store 130. Role-based authorization is a mechanism for controlling access to one or more resources based on roles assigned to a component or a group of components. For example, pod upgrade controller 120 may be deployed in tenant namespace 320 but may be given authorization to create and manage locks 220 in lock store namespace 330. In some cases, an upgrade controller (e.g., node upgrade controller 110) may exist in the same namespace as lock store 130 and thus be able to create and manage locks 220 at lock store 130 without having to be authorized using role-based authorization.

In various embodiments, upgrade controllers obtain and manage locks 220 using lock API component 310. Lock API component 310, in various embodiments, is an API wrapper or software routines that implement the methods of the lock API that can be used to create, renew, and release locks 220. Lock API component 310 can be a reusable component (a plug and play component) and thus it may be incorporated into multiple upgrade controllers with minimal or no configuration needed. As shown for example, node upgrade controller 110 and pod upgrade controller 120 use the same lock API component 310. When an upgrade controller wishes to perform upgrades with respect to a particular node pool 140, the upgrade controller invokes lock API component 310 to create a lock 220. Lock API component 310 may verify that there are no existing locks 220 on the particular node pool 140 and then create a record (representing a lock 220 on the particular node pool 140) at lock store 130 having a specification specifying the metadata discussed with respect to FIG. 2 (e.g., the specification specifies a time duration). The record may be accessible to other upgrade controllers that have access to lock store 130 (e.g., pod upgrade controller 120 may access a record created by node upgrade controller 110 to learn that a lock 220 has been acquired on a node pool 140). When an upgrade controller has completed its upgrades, it may invoke lock API component 310 to release a particular lock 220, including removing that lock's record from lock store 130. If an upgrade controller determines to renew a particular lock 220, then it may invoke lock API component 310 to renew the duration time before the particular lock 220 expires.

Figure 4:
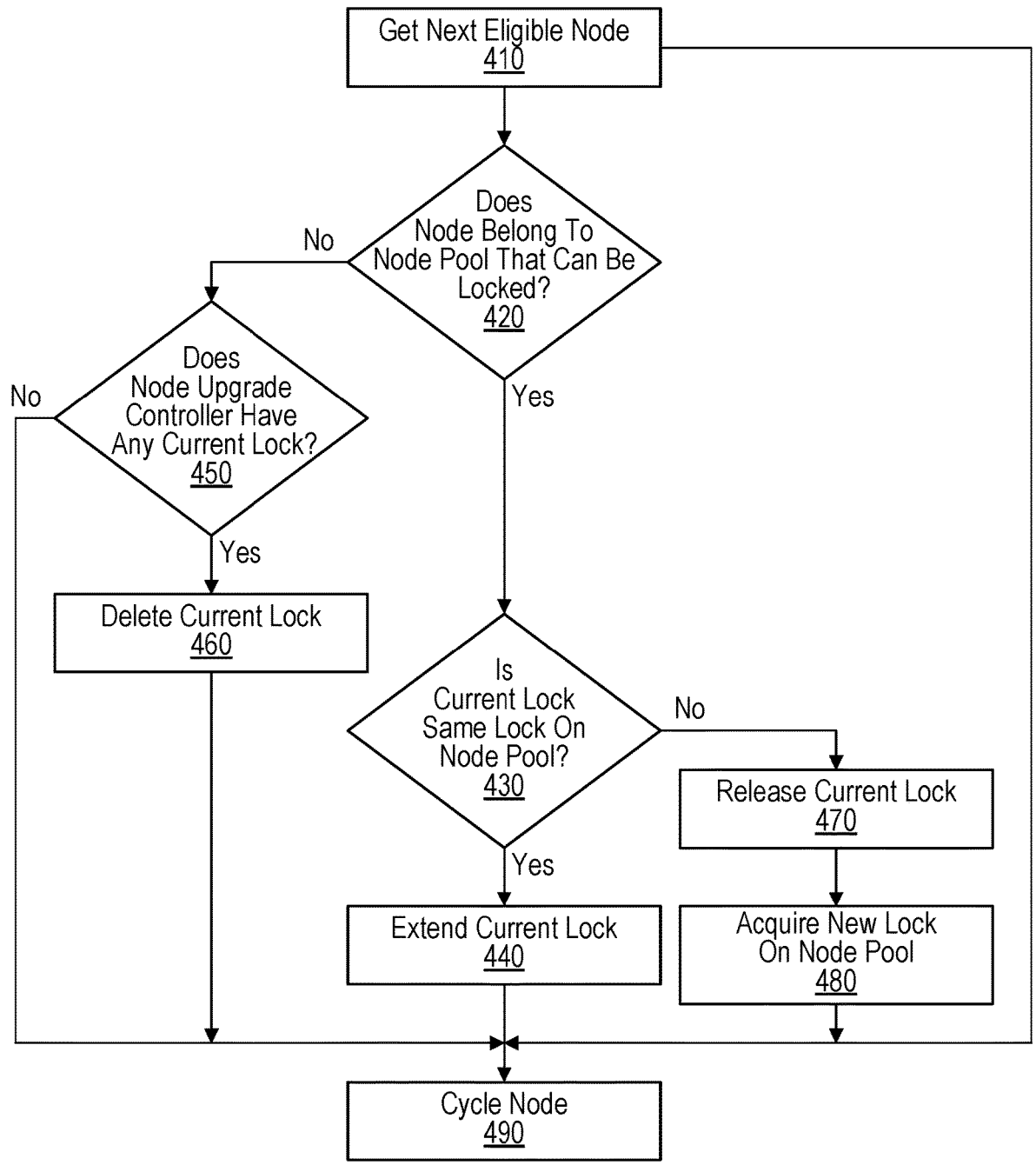
FIG. 4 is a flow diagram illustrating an upgrade process that is performed by an upgrade controller, according to some embodiments.

Turning now to FIG. 4, a flow diagram illustrating an upgrade process performed by an upgrade controller (e.g., node upgrade controller 110) is shown. In the illustrated embodiment, the upgrade process includes a series of steps 410-490. Steps 410-490 may be implemented by node upgrade controller 110 and pod upgrade controller 120. This process may be implemented differently than shown. For example, the upgrade process might include an additional step in which a lock 220 is transferred between upgrade controllers.

In various embodiments, the illustrated upgrade process is performed by an upgrade controller in response to the occurrence of a trigger event that indicates that a set of upgrade(s) should be performed. As an example, the trigger event might be a detection by node upgrade controller 110 that there is a difference between the image version of deployed nodes 142 and the image version stored at a repository. Once the trigger event occurs, the upgrade controller proceeds to step 410. At step 410, the upgrade controller selects a node 142 (e.g., node 142A) from a list of upgradable nodes 142 (or nodes 142 that have upgradable pods 144). In various embodiments, nodes 142 belonging to a locked node pool 140 may be filtered from the list of upgradable nodes 142. The process of filtering out nodes is further discussed in respect to FIG. 5A. When a node 142 has been selected, the upgrade controller may proceed to step 420 in which it determines if the selected node 142 belongs to an available node pool 140 based on a list of locks 220 stored in lock store 130. For example, node upgrade controller 110 may invoke lock API component 310 to access the existing set of locks 220 stored in lock store 130 and determine that the node pool 140 of the selected node 142 is already locked by pod upgrade controller 120. But if that node pool 140 is not locked by another upgrade controller, then the upgrade controller 110 proceeds to step 430.

If the upgrade controller already holds a lock 220 on that node pool 140 (as assessed at step 430), then the upgrade controller invokes lock API component 310 to extend the lock's time duration 225 and record the renew time in step 440. If the upgrade controller holds a lock 220 that is not associated with the node pool 140 having the selected node 142, then the upgrade controller invokes lock API component 310 to release the current lock 220 held by the upgrade controller in step 470 and remove that lock 220 from lock store 130. In step 480, the upgrade controller then obtains a new lock 220 on the node pool 140 containing node 142.

Referring back to step 420, the selected node 142 may already belong to a locked node pool 140 and thus is unable to be updated. For example, pod upgrade controller 120 may obtain a lock 220 on the node pool 140 (containing a pod 144 that pod upgrade controller 120 wishes to upgrade) prior to node upgrade controller 110. Node upgrade controller 110, in various embodiments, decides to wait for pod upgrade controller 120 to finish and release its lock 220 or defer the particular node pool 140 for a different time (e.g., until pod upgrade controller 120 has released its lock on that node pool 140). The process of deferring upgrade controllers is discussed in further detail with respect to FIG. 5B. When the selected node 142 belongs to locked node pool 140, the upgrade controller then proceeds to step 450. In various cases, the upgrade controller may already hold a lock 220 on a different node pool 140 independent of the selected node 142 and thus proceeds to step 460. In step 460, the upgrade controller invokes lock API component 310 and releases the current lock 220 held by the upgrade controller. The record of that lock 220 may be deleted from lock store 130, and the node pool 140 associated with that lock 220 may be made accessible to other upgrade controllers.

At step 490, the upgrade controller then cycles the selected node 142. If the upgrade controller was able to obtain a lock 220 or holds a lock 220 on the selected node's node pool 140, then cycling the selected node 142 can include upgrading the node 142 in the case of node upgrade controller 110 or upgrading a pod 144 on the selected node 142 in the case of pod upgrade controller 120. If the upgrade controller is not able to obtain a lock 220 on the selected node 142, then it does not perform the upgrade with respect to that node 142 and potentially proceeds to select another node 142. If the upgrade controller determines (e.g., based on a list maintained at lock store 130) that another node 142 is available, then the upgrade controller proceeds back to step 410.

Figure 5A:
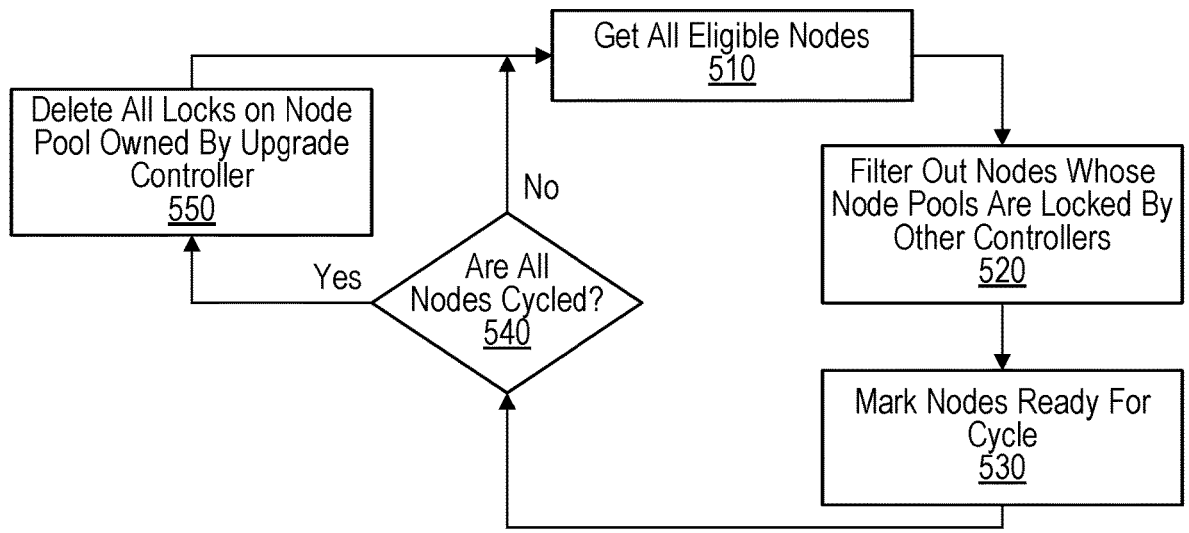
FIG. 5A is a flow diagram illustrating another upgrade process that is performed by an upgrade controller, according to some embodiments.

Turning now to FIG. 5A, a flow diagram illustrating another example upgrade process performed by an upgrade controller (e.g., node upgrade controller 110) that involves filtering nodes 142 that belong to a locked node pool 140 is shown. In the illustrated embodiment, the upgrade process includes a series of steps 510-550. Steps 510-550, in various embodiments, are performed by node upgrade controller 110 and pod upgrade controller 120. This process may be implemented differently than shown. For example, this process may be performed by a separate component (e.g., a scheduler component) independent of the upgrade controller.

Similar to the upgrade process discussed in regards to FIG. 4, in various embodiments, the illustrated upgrade process may be performed in response to the occurrence of a trigger event that indicates that a set of upgrades should be performed. In step 510, all eligible nodes 142 containing outdated node images or having pods 144 that need to be updated are identified by the upgrade controller. In some embodiments, topology information is stored in a repository that is accessible to the upgrade controllers and can be used to determine which nodes 142 are to be updated. For example, the topology information may specify the version of a node 142 (or a pod 144) and the node pool 140 to which that node 142 belongs. In step 520, nodes 142 deployed on a node pool 140 locked by another upgrade controller are filtered from the eligible nodes 142. For example, pod upgrade controller 120 may determine to upgrade a set of pods 144 deployed on a particular node pool 140, and by subsequently obtaining a lock 220 on that node pool 140, all respective nodes 142 deployed on that node pool 140 are removed from the group of eligible nodes. To determine which nodes 142 are locked, the upgrade controller may issue a request to lock store 130 for information describing which node pools 140 are currently locked. Based on the information, the upgrade controller may remove the nodes 142 belonging to locked node pools 140. After the locked nodes 142 are removed from the group of eligible nodes 142, the remaining nodes 142 are deemed eligible for upgrading in step 530.

The upgrade controller, in various embodiments, obtains, renews, and releases locks 220 on node pools 140 that have eligible nodes 142 as required until all eligible nodes 142 are upgraded. In some embodiments, an upgrade controller obtains locks 220 on multiple node pools 140 and may perform upgrades with respect to multiple node pools 140 at least partially in parallel. For example, node upgrade controller 110 may concurrently upgrade nodes 142 in two different node pools 140. In step 540, the upgrade controller determines if all eligible nodes 142 (or the pods 144 on those nodes 142) were successfully upgraded to their respective updated version, and if the upgrade process is complete, all current locks 220 associated with the upgraded nodes 142 are deleted in step 550. If not, then the process returns to step 510 and repeats until all eligible nodes are successfully updated.

Figure 5B:
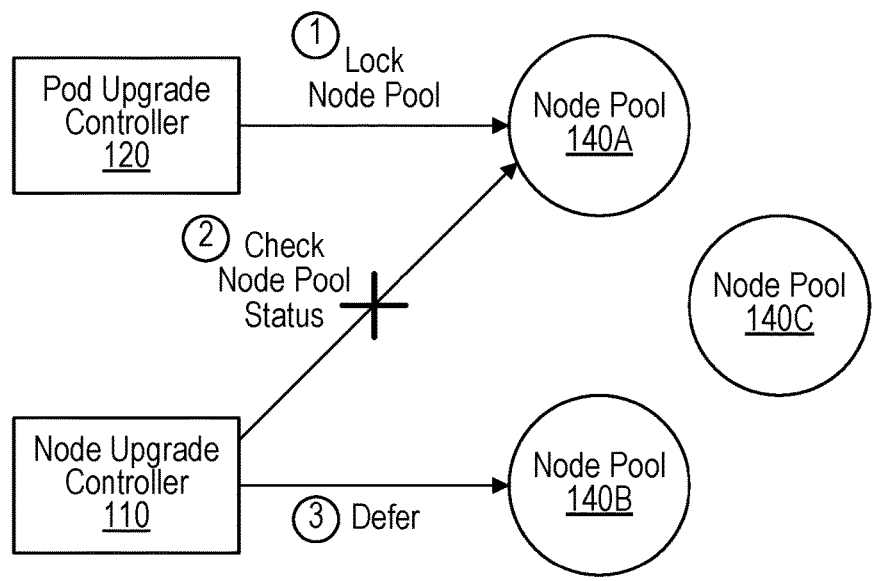
FIG. 5B is a block diagram illustrating an example in which an upgrade controller defers to upgrade a second node pool in response to a first node pool being locked, according to some embodiments.

Turning now to FIG. 5B, a block diagram illustrating an example in which an upgrade controller defers to upgrade a second node pool in response to a first node pool being locked is shown. In the illustrated embodiment, there is node upgrade controller 110, pod upgrade controller 120, and node pools 140A-140C. This process may be implemented differently than shown. For example, node upgrade controller 110 may defer to a different node pool 140 based on a user request. In various embodiments, an upgrade controller may attempt to perform an update with respect to a node pool 140 that is already locked by a different upgrade controller. For example, node upgrade controller 110 may access lock store 130 and determine that node pool 140A is locked by pod upgrade controller 120 as upgrade controller 120 obtained a lock 220 to update a set of pods on node pool 140A before node upgrade controller 110 attempted to access node pool 140A. In response to a locked node pool 140, the upgrade controller, in various embodiments, may decide to standby until that locked node pool 140 is not locked before performing the upgrade with respect to that node pool 140 or defer to another available node pool 140. As shown, node upgrade controller 110 defers to 140B to update a set of nodes 142 in node pool 140B after determining that node pool 140A has been locked by pod upgrade controller 120. After upgrading the set of nodes 142, node upgrade controller 110 may attempt to obtain a lock on node pool 140A to perform the update that was deferred.

Figure 6:
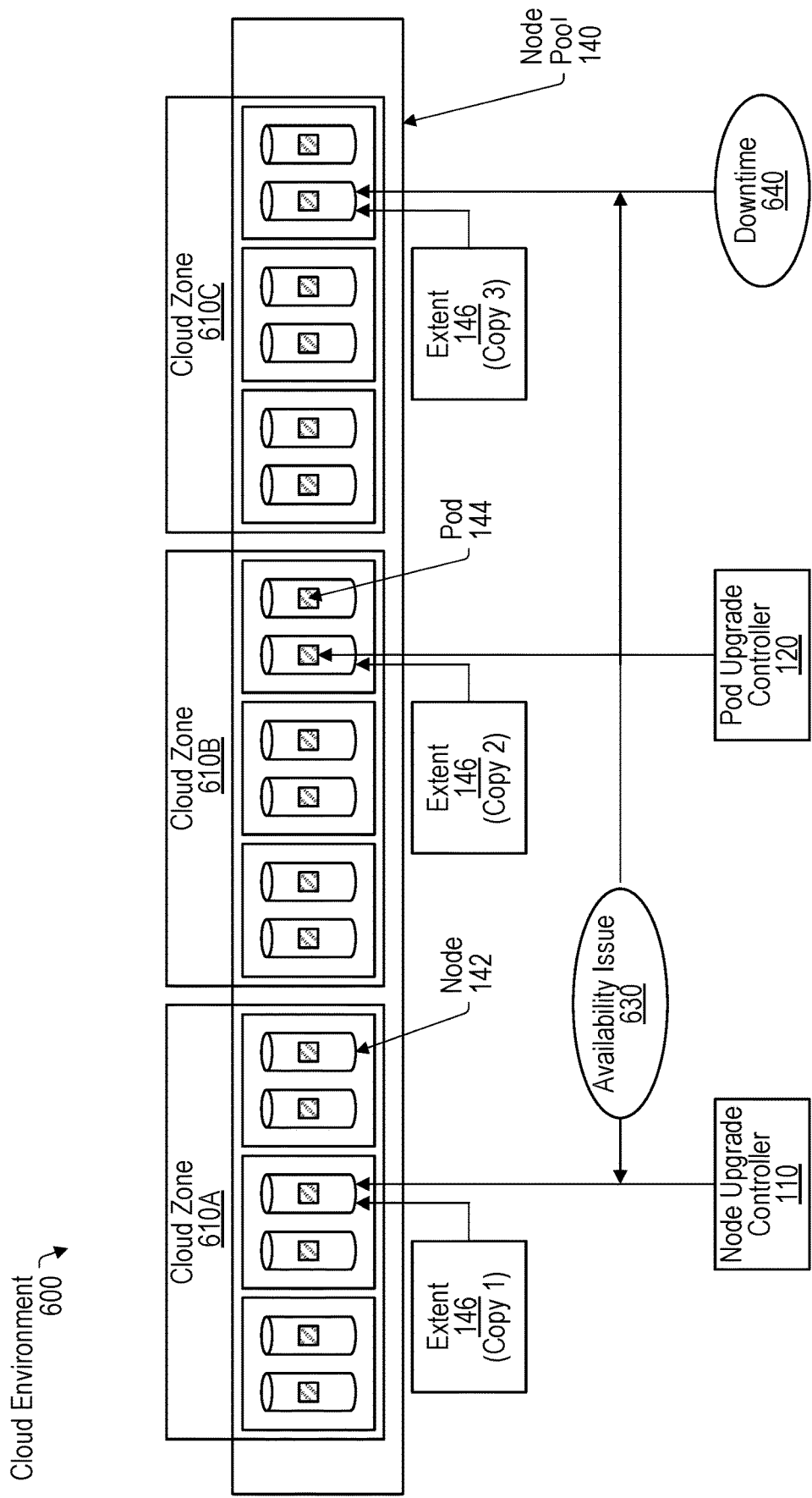
FIG. 6 is a block diagram illustrating an example in which preventing multiple upgrade controllers from upgrading nodes of the same node pool protects a system, according to some embodiments.

Turning now to FIG. 6, a block diagram illustrating an availability issue 630 within a cloud environment 600. In the illustrated environment, cloud environment 600 includes node upgrade controller 110, pod upgrade controller 120, and cloud zones 610A-C having a node pool 140. As further depicted, node pool 140 includes nodes 142 that have pods 144. Also as shown, three copies of an extent 146 are stored within node pool 140, one per cloud zone 610. In some embodiments, cloud environment 600 is implemented differently than shown. For example, node upgrade controller 110 and pod upgrade controller 120 might execute within node pool 140 (e.g., execute on a node 142 of node pool 140).

Cloud environment 600, in various embodiments, is a cloud infrastructure that includes various components (e.g., hardware, virtualized resources, storage, and network resources) for providing cloud computing services to users. In some cases, cloud environment 600 may be a public cloud provided by a cloud provider to multiple customers that implements their systems using the various components/resources of the public cloud; in other cases, cloud environment 600 is a private cloud that is available to only select users instead of the general public. In some embodiments, cloud environment 600 is spread across various geographical locations and each location may define a "region" of cloud environment 600. Within a given region, there may be one or more cloud zones 610. As an example, cloud zones 610A-C might be a part of the same region, although they can be in separate regions. A cloud zone 610, in various embodiments, is a logical or physical grouping of components (e.g., computing resources, storage resources, etc.) within a region. In many cases, the components of a cloud zone 610 are isolated from the failures of components in other cloud zones 610. For example, cloud zone 610A may be a first data center in a particular region and cloud zone 610B may be a second data center in that same region. Cloud zone 610A may be isolated from cloud zone 610B such that a failure at the data center of cloud zone 510B does not affect the data center of cloud zone 610A. In some cases, cloud zones 610A and 610B might be the same data center but correspond to components on separate networks such that one cloud zone 610 might not be affected by the other cloud zone 610.

As mentioned, when a node 142 or a pod 144 undergoes an upgrade, the data managed by that pod 144 being upgraded, or the pod of that node 142 that is being upgraded, becomes unavailable to various database operations. Availability issue 630 can arise when node and pod upgrade controllers 110 and 120 are simultaneously performing upgrades that affect access to the copies of extent 146. As shown, node upgrade controller 110 performs an upgrade of a node 142 on which a first copy of extent 146 resides, causing that first copy to be unavailable. Similarly, the second copy of extent 146 is made unavailable when pod upgrade controller 120 is updating a pod 144 in cloud zone 610B that facilitates access to the second copy. Finally, the third copy of extent 146 can become unavailable if cloud zone 610C experiences downtime 640. Downtime 640, in various embodiments, may include infrastructure issues consisting of network failures, power outages, or software bugs. Using the techniques discussed above, one of the upgrade controllers (e.g., node upgrade controller 110) may obtain a lock on node pool 140 and prevent the other upgrade controller (e.g., pod upgrade controller 120) from upgrading a component within node pool 140. As a result, even if downtime 640 occurs with respect to cloud zone 610C (causing the third copy to become unavailable), the second copy of extent 146 in cloud zone 610C may still be accessible and thus a service disruption can be avoided.

Figure 7:
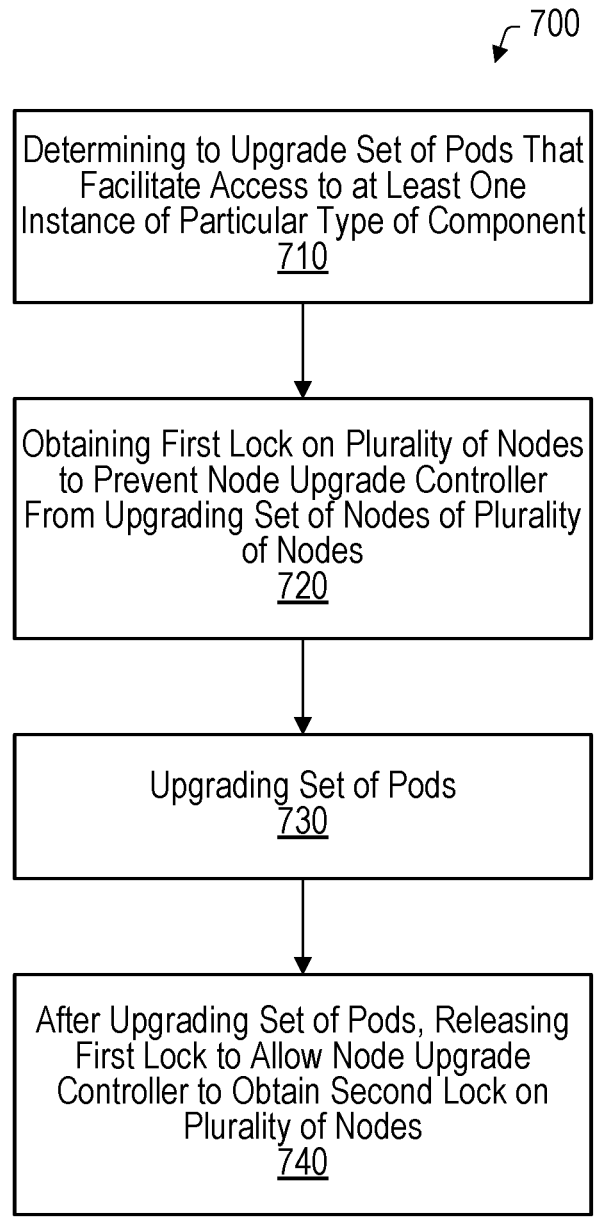
FIGS. 7 and 8 are flow diagrams illustrating example methods that pertain to an upgrade process that involves acquiring a lock on a node pool, according to some embodiments.

Turning now to FIG. 7, a flow diagram of a method 700 is shown. Method 700 is one embodiment of a method performed by a pod upgrade controller (e.g., pod upgrade controller 120) that is executing on a computer system to prevent multiple upgrade controllers (e.g., node and pod upgrade controllers 110 and 120) from concurrently performing upgrades that affect access to a particular component (e.g., an extent 146) (or a particular type of component) of a service such that a requisite number of instances of the particular component is not available (e.g., 2 out of 3 copies of a data extent are not available—that is, only one instance of the data extent is available). Method 700 may be performed by executing program instructions stored on a non-transitory computer-readable medium. Method 700 may include more or less steps than shown. For example, there may be a step in which the pod upgrade controller detects that an upgraded image is available for a set of pods (e.g., pods 144).

Method 700 begins in step 710 with the pod upgrade controller determining to upgrade a first set of pods (e.g., pod 144A) that facilitates access to at least one instance of the particular component (e.g., extent 146A). The first set of pods executes on a first set (e.g., node 142A) of a plurality of nodes (e.g., node pool 140) used to implement the service. In various cases, the particular component is a data extent usable to store database records.

In step 720, the pod upgrade controller obtains a first lock (e.g., a lock 220) on the plurality of nodes to prevent a node upgrade controller (e.g., node upgrade controller 110) from upgrading a second set (e.g., node 142B) of the plurality of nodes. A second set of pods (e.g., pod 144B) executes on the second set of nodes and facilitates access to at least another instance of the particular component (e.g., extent 146B). In various cases, the unavailability of the first and second sets of pods causes the requisite number of instances to not be available. As an example, it may be desirable to have at least two instances of an extent available. Thus, if there are only three instances, and two of them are unavailable due to the first and second sets of pods being down, then the requisite number of instances is not available. The first lock may prevent multiple upgrade controllers, other than the pod upgrade controller, from bringing down the first and second sets of pods while the first lock is held by the pod upgrade controller.

In various embodiments, obtaining the first lock includes the pod upgrade controller invoking an application programming interface (API) to store, in a data store (e.g., lock store 130) that is external but accessible to the pod and node upgrade controllers, a record having a specification that describes the first lock. The specification may specify an identity of the first lock (e.g., a name 221), an identity of the pod upgrade controller (e.g., a holder identity 233), a time at which the first lock was acquired by the pod upgrade controller (e.g., an acquire time 224), a time duration for how long the first lock is active before expiring (e.g., a time duration 225), and a time at which the first lock was renewed by the pod upgrade controller (e.g., a renew time 226). The same API calling component (e.g., claims API component 310) may be incorporated into the pod and node upgrade controllers to enable them to store and access, at the data store, records having specifications describing locks. In various embodiments, the data store is in a protected namespace (e.g., lock store namespace 330) that prevents unauthorized access to the data store and is different than the namespace of the pod upgrade controller (e.g., tenant namespace 320). Accordingly, the pod upgrade controller may be granted permission to access the data store.

In step 730, the pod upgrade controller upgrades the first set of pods. After upgrading a threshold number of pods, the pod upgrade controller may renew the time duration such that the first lock expires at a different time (e.g., later in the future). In some cases, in response to detecting that the time duration indicates that a threshold amount of time is left before the first lock expires, the pod upgrade controller renews the time duration such that the first lock expires at a different time. That is, in response to determining that the remaining amount of time of the time duration is not sufficient to complete the upgrading of the first set of pods, the pod upgrade controller may renew the first lock to add additional time to the time duration.

In step 740, after upgrading the first set of pods, the pod upgrade controller releases the first lock to allow the node upgrade controller to obtain a second lock on the plurality of nodes. Before releasing the first lock after upgrading the first set of pods, the pod upgrade controller may upgrade the second set of pods and after upgrading the second set of pods, release the first lock to allow the node upgrade controller to obtain the second lock on the plurality of nodes. The node upgrade controller may make a determination, based on the record stored at the data store, that the pod upgrade controller has obtained a lock on the plurality of nodes. In response to the determination, the node upgrade controller may then obtain a lock on another plurality of nodes and upgrade ones of that plurality of nodes before upgrading the second set of nodes.

Figure 8:
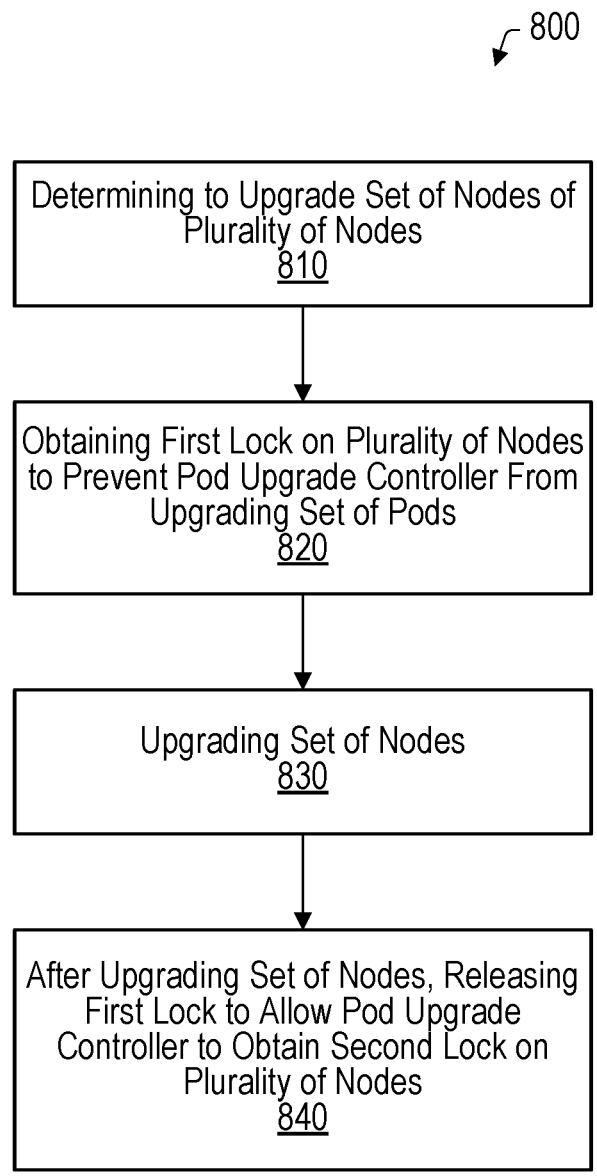

Turning now to FIG. 8, a flow diagram of a method 800 is shown. Method 800 is one embodiment of a method performed by a node upgrade controller (e.g., node upgrade controller 110) that is executing on a computer system to prevent multiple upgrade controllers (e.g., node and pod upgrade controllers 110 and 120) from concurrently performing upgrades that affect access to a particular component (e.g., an extent 146) of a service such that a requisite number of instances of the particular component is not available (e.g., 2 out of 3 copies of a data extent are not available—that is, only one instance of the data extent is available). Method 800 may be performed by executing program instructions stored on a non-transitory computer-readable medium. Method 800 may include more or less steps than shown. For example, there may be a step in which the node upgrade controller detects that an upgraded image is available for a set of nodes (e.g., nodes 142).

Method 800 begins in step 810 with the node upgrade controller determining to upgrade a first set of nodes (e.g., node 142A) of a plurality of nodes (e.g., node pool 140). A first set of pods (e.g., pod 144A) executes on the first set of nodes and facilitates access to at least one instance of a particular component (e.g., extent 146A). In various embodiments, the determining to upgrade the first set of nodes includes filtering, from a list of available nodes that includes the plurality of nodes, those nodes that are locked by another upgrade controller. Based on the filtering, the node upgrade controller determines that the first set of nodes is not locked by another upgrade controller.

In step 820, the node upgrade controller obtains a first lock (e.g., a lock 220) on the plurality of nodes to prevent a pod upgrade controller (e.g., pod upgrade controller 120) from upgrading a second set of pods (e.g., pod 144B). The second set of pods executes on a second set of nodes (e.g., node 142B) of the plurality of nodes and facilitates access to at least another instance of the particular component (e.g., extent 146B). In various embodiments, the unavailability of the first and second sets of pods causes the requisite number of instances of the particular component to not be available. Obtaining the first lock can include the node upgrade controller storing, in a data store (e.g., lock store 130) accessible to the pod and node upgrade controllers, a record that includes specification specifying an identity of the node upgrade controller (e.g., a name 221) and a time duration (e.g., a time duration 225) indicative of how long before the first lock expires and is released independent of whether the node upgrade controller releases the first lock.

In step 830, the node upgrade controller upgrades the first set of nodes. In step 840, after upgrading the first set of nodes, the node upgrade controller releases the first lock to allow the pod upgrade controller to obtain a second lock on the plurality of nodes. In some cases, the node upgrade controller determines to upgrade the second set of nodes before releasing the first lock. Before upgrading the second set of nodes, the node upgrade controller may modify the time duration associated with the first lock so that the first lock expires at a different time (e.g., a later time). In some cases, the first lock is released by the node upgrade controller after upgrading all nodes of the plurality of nodes.

Exemplary Computer System

Figure 9:
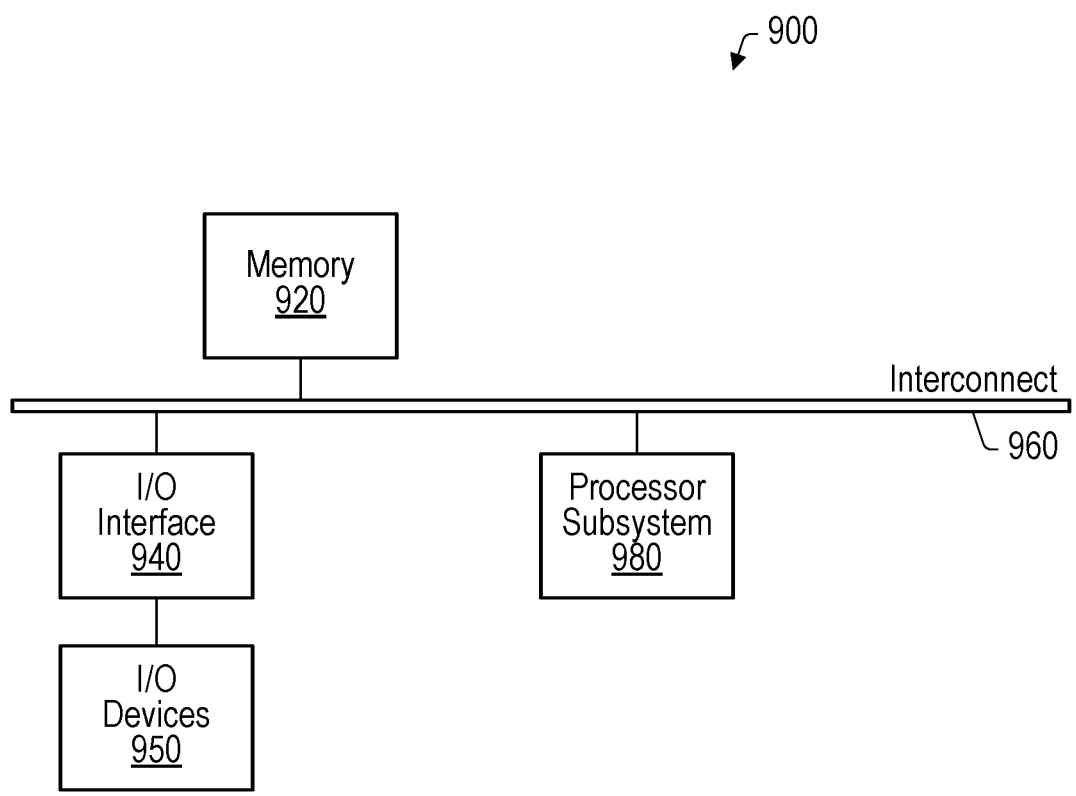
FIG. 9 is a block diagram illustrating elements of a computer system for implementing various systems described in the present disclosure, according to some embodiments.

Turning now to FIG. 9, a block diagram of an exemplary computer system 900, which may implement system 100, node upgrade controller 110, pod upgrade controller 120, lock store 130, and/or a node 142, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement node upgrade controller 110, pod upgrade controller 120, lock store 130, a node 142, and/or a pod 144 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method to prevent multiple upgrade controllers from concurrently performing upgrades that affect access to a particular component of a service such that a requisite number of instances of the particular component is not available, the method comprising:
determining, by a pod upgrade controller executing on a computer system, to upgrade a first set of pods that facilitate access to at least one instance of the particular component, wherein the first set of pods executes on a first set of a plurality of nodes used to implement the service;
obtaining, by the pod upgrade controller, a first lock on the plurality of nodes to prevent a node upgrade controller from upgrading nodes in a second set of the plurality of nodes on which a second set of pods executes that facilitates access to at least another instance of the particular component, and wherein an unavailability of the first and second sets of pods causes the requisite number of instances to not be available, and wherein the pod upgrade controller is operable to upgrade pods and the node upgrade controller is operable to upgrade nodes;
upgrading, by the pod upgrade controller, the first set of pods; and
after upgrading the first set of pods, the pod upgrade controller releasing the first lock to allow the node upgrade controller to obtain a second lock on the plurality of nodes.

2. The method of claim 1, wherein the obtaining of the first lock includes:
invoking, by the pod upgrade controller, an application programming interface (API) to store, in a data store that is external but accessible to the pod and node upgrade controllers, a record having a specification describing the first lock.

3. The method of claim 2, wherein a same API calling component is incorporated into the pod and node upgrade controllers to enable the pod and node upgrade controllers to store and access, at the data store, records having specifications describing locks.

4. The method of claim 2, wherein the data store is associated with a protected namespace that prevents unauthorized access to the data store and is different than a namespace of the pod upgrade controller, and wherein the pod upgrade controller is granted permission to access the data store.

5. The method of claim 2, wherein the node upgrade controller is operable to:
make a determination, based on the record, that the pod upgrade controller has obtained the first lock on the plurality of nodes; and
in response to the determination:
obtain a lock on another plurality of nodes; and
upgrade ones of the other plurality of nodes before upgrading the second set of nodes.

6. The method of claim 2, wherein the specification specifies an identity of the first lock, an identity of the pod upgrade controller, a time at which the first lock was acquired by the pod upgrade controller, a time duration for how long the first lock is active before expiring, and a time at which the first lock was renewed by the pod upgrade controller.

7. The method of claim 6, and wherein the method further comprises:
in response to detecting that the time duration indicates that a threshold amount of time is left before the first lock expires, the pod upgrade controller renewing the time duration such that the first lock expires at a different time.

8. The method of claim 6, and wherein the method further comprises:
after upgrading a threshold number of pods, the pod upgrade controller renewing the time duration such that the first lock expires at a different time.

9. The method of claim 1, further comprising:
before releasing the first lock after upgrading the first set of pods, the pod upgrade controller upgrading the second set of pods; and
after upgrading the second set of pods, the pod upgrade controller releasing the first lock to allow the node upgrade controller to obtain the second lock on the plurality of nodes.

10. The method of claim 1, wherein the first lock prevents multiple upgrade controllers, other than the pod upgrade controller, from bringing down the first and second sets of pods while the first lock is held by the pod upgrade controller.

11. The method of claim 1, wherein the particular component is a data extent usable to store database records, and wherein the at least one instance and the at least another instance are copies of a particular data extent storing a particular set of database records.

12. A non-transitory computer-readable medium having program instructions stored thereon that are capable of causing a pod upgrade controller executing on a computer system to perform operations comprising:

determining to upgrade a first set of pods that facilitate access to at least one copy of particular data, wherein the first set of pods executes on a first set of virtual machines (VMs) of a plurality of VMs used to implement a service, wherein a given pod includes one or more containerized applications;

obtaining a first lock on the plurality of VMs to prevent a node upgrade controller from upgrading VMs of a second set of VMs of the plurality of VMs on which a second set of pods executes that facilitates access to at least another copy of the particular data, and wherein an unavailability of the first and second sets of pods causes a requisite number of copies of the particular data to not be available;

upgrading the first set of pods; and after upgrading the first set of pods, releasing the first lock to allow the node upgrade controller to obtain a second lock on the plurality of VMs.

13. The non-transitory computer-readable medium of claim 12, wherein the obtaining of the first lock includes:

invoking an application programming interface (API) to store, in a data store that is external but accessible to the pod and node upgrade controllers, a record having a specification specifying an identity of the pod upgrade controller and a time duration for how long the first lock is active before expiring.

14. The non-transitory computer-readable medium of claim 13, wherein the operations further comprise:

in response to determining that a remaining amount of time of the time duration is not sufficient to complete upgrading the first set of pods, renewing the first lock to add additional time to the time duration.

15. The non-transitory computer-readable medium of claim 13, wherein the data store is associated with a protected namespace that prevents unauthorized access to the data store and is different than a namespace of the pod upgrade controller, and wherein the pod upgrade controller is granted permission to access to the data store.

16. A non-transitory computer-readable medium having program instructions stored thereon that are capable of causing a node upgrade controller executing on a computer system to perform operations comprising:

determining to upgrade a first set of nodes of a plurality of nodes, wherein a first set of pods executes on the first set of nodes and facilitates access to at least one instance of a particular component, wherein a given pod includes one or more containerized applications;

obtaining a first lock on the plurality of nodes to prevent a pod upgrade controller from upgrading pods of a second set of pods, wherein the second set of pods executes on a second set of nodes of the plurality of nodes and facilitates access to at least another instance of the particular component, and wherein an unavailability of the first and second sets of pods causes a requisite number of instances of the particular component to not be available, and wherein the pod upgrade controller is operable to upgrade pods and the node upgrade controller is operable to upgrade nodes;

upgrading the first set of nodes; and after upgrading the first set of nodes, releasing the first lock to allow the pod upgrade controller to obtain a second lock on the plurality of nodes.

17. The non-transitory computer-readable medium of claim 16, wherein the obtaining of the first lock includes:

storing, in a data store accessible to the pod and node upgrade controllers, a record that includes specification specifying an identity of the node upgrade controller and a time duration indicative of how long before the first lock expires and is released independent of whether the node upgrade controller releases the first lock.

18. The non-transitory computer-readable medium of claim 17, wherein the operations further comprise:

determining to upgrade the second set of nodes before releasing the first lock; and before upgrading the second set of nodes, modifying the time duration associated with the first lock so that the first lock expires at a different time.

19. The non-transitory computer-readable medium of claim 16, wherein the first lock is released by the node upgrade controller after upgrading the plurality of nodes.

20. The non-transitory computer-readable medium of claim 16, wherein the determining to upgrade the first set of nodes includes:

filtering, from a list of available nodes that includes the plurality of nodes, those nodes that are locked by another upgrade controller; and determining, based on the filtering, that the first set of nodes is not locked by another upgrade controller.

* * * * *